(12) United States Patent
Takiguchi et al.

(10) Patent No.: US 11,966,035 B2
(45) Date of Patent: Apr. 23, 2024

(54) LIGHT SHEET MICROSCOPE AND SAMPLE OBSERVATION METHOD

(71) Applicant: HAMAMATSU PHOTONICS K.K., Hamamatsu (JP)

(72) Inventors: Yuu Takiguchi, Hamamatsu (JP); Rumika Tanaka, Hamamatsu (JP); Hisayoshi Takamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 820 days.

(21) Appl. No.: 16/971,753

(22) PCT Filed: Dec. 26, 2018

(86) PCT No.: PCT/JP2018/047909
§ 371 (c)(1),
(2) Date: Aug. 21, 2020

(87) PCT Pub. No.: WO2019/167408
PCT Pub. Date: Sep. 6, 2019

(65) Prior Publication Data
US 2021/0088766 A1    Mar. 25, 2021

(30) Foreign Application Priority Data
Feb. 28, 2018  (JP) ................. 2018-034362

(51) Int. Cl.
*G02B 21/00* (2006.01)
*G01N 21/63* (2006.01)

(52) U.S. Cl.
CPC ......... *G02B 21/0032* (2013.01); *G01N 21/63* (2013.01); *G02B 21/008* (2013.01)

(58) Field of Classification Search
CPC .. G02B 21/0032; G02B 21/008; G02B 21/06; G01N 21/64; G01N 21/63
See application file for complete search history.

(56) References Cited

U.S. PATENT DOCUMENTS 5,442,438 A    8/1995    Batchelder et al.
5,880,846 A *  3/1999    Hasman ............ G01B 11/2509
                                                356/613
(Continued)

FOREIGN PATENT DOCUMENTS

CN    203054334 U    7/2013
CN    104067158 A    9/2014
(Continued)

OTHER PUBLICATIONS

International Preliminary Report on Patentability dated Sep. 10, 2020 for PCT/JP2018/047909.

*Primary Examiner* — Mustak Choudhury
(74) *Attorney, Agent, or Firm* — Faegre Drinker Biddle & Reath LLP

(57) ABSTRACT

A light sheet microscope includes an irradiation optical system, a detection optical system, and a photodetector. The irradiation optical system includes a wavelength sweep light source which outputs light of which a wavelength changes with time as excitation light, a spectroscopic element on which the excitation light output from the wavelength sweep light source is incident and which emits the excitation light at an emission angle corresponding to a wavelength of the excitation light, a relay optical system which includes a cylindrical lens on which the excitation light emitted from the spectroscopic element is incident at an incident angle corresponding to the emission angle, and a first objective lens which condenses the excitation light guided by the relay optical system and irradiates the sample with the excitation light having a sheet shape.

12 Claims, 8 Drawing Sheets

(56) References Cited

U.S. PATENT DOCUMENTS

| | | | |
|---|---|---|---|
| 5,946,090 A | 8/1999 | Tashiro et al. | |
| 2001/0028455 A1 | 10/2001 | Uhl | |
| 2008/0316561 A1 | 12/2008 | Okugawa | |
| 2012/0223219 A1* | 9/2012 | Grier | G02B 5/32 |
| | | | 250/251 |
| 2014/0218793 A1* | 8/2014 | Mcmahon | G02B 21/26 |
| | | | 200/61.42 |
| 2016/0327779 A1* | 11/2016 | Hillman | G02B 21/0032 |

FOREIGN PATENT DOCUMENTS

| | | |
|---|---|---|
| CN | 102455501 A | 6/2016 |
| CN | 105683803 A | 6/2016 |
| DE | 4228366 A1 | 3/1994 |
| JP | S63-074022 A | 4/1988 |
| JP | 2004-212600 A | 7/2004 |
| JP | 2006-509246 A | 3/2006 |
| JP | 2012-108491 A | 6/2012 |
| JP | 2013-097380 A | 5/2013 |
| JP | 2014-531060 A | 11/2014 |
| JP | 2015-523602 A | 8/2015 |
| JP | 2015-537236 A | 12/2015 |
| JP | 2016-529558 A | 9/2016 |
| JP | 2017-517761 A | 6/2017 |
| WO | WO-2004/053558 A1 | 6/2004 |
| WO | WO-2013/060644 A1 | 5/2013 |
| WO | WO 2014/009080 A1 | 1/2014 |
| WO | WO-2014/056992 A1 | 4/2014 |
| WO | WO 2015/028493 A1 | 3/2015 |
| WO | WO-2015/184124 A1 | 12/2015 |

\* cited by examiner (a)

(b)

(c)

LIGHT SHEET MICROSCOPE AND SAMPLE OBSERVATION METHOD

TECHNICAL FIELD

One aspect of the present disclosure relates to a light sheet microscope and a sample observation method.

BACKGROUND ART

A light sheet microscope which irradiates a sample with sheet-shaped excitation light and detects detection light emitted from the sample along with the irradiation of the excitation light is known (for example, see Patent Literature 1). In such a light sheet microscope, a container storing a sample is held by a holder and the holder is moved or rotated when observing the sample so that an irradiation position of the excitation light with respect to the sample is scanned.

CITATION LIST

Patent Literature

Patent Literature 1: Japanese Unexamined Patent Publication No. 2006-509246

SUMMARY OF INVENTION

Technical Problem

However, in the above-described light sheet microscope, there is a possibility that the sample may shake during observation and stable observation may not be possible. Further, since the scanning speed of the excitation light is determined by the moving speed of the holder, it is difficult to perform the high-speed observation. A method of disposing the sample on a stage and moving or rotating the stage can be also considered, but there is a problem similar to the case of moving or rotating the holder in terms of stability and speedup.

One aspect of the present disclosure is to provide a light sheet microscope and a sample observation method capable of realizing high-speed and stable observation.

Solution to Problem

A light sheet microscope according to one aspect of the present disclosure includes: an irradiation optical system which irradiates a sample with excitation light having a wavelength for exciting the sample; a detection optical system which guides detection light emitted from the sample along with the irradiation of the excitation light; and a photodetector which detects the detection light guided by the detection optical system, in which the irradiation optical system includes a wavelength sweep light source which outputs light of which a wavelength changes with time as the excitation light, a spectroscopic element into which the excitation light output from the wavelength sweep light source is incident and which emits the excitation light at an emission angle corresponding to a wavelength of the excitation light, a relay optical system which includes a cylindrical lens into which the excitation light emitted from the spectroscopic element is incident at an incident angle corresponding to the emission angle, and a first objective lens which condenses the excitation light guided by the relay optical system and irradiates the sample with the excitation light having a sheet shape.

In the light sheet microscope, light of which a wavelength changes with time is output from the wavelength sweep light source as the excitation light, the excitation light output from the wavelength sweep light source is emitted from the spectroscopic element at the emission angle corresponding to the wavelength, and the excitation light emitted from the spectroscopic element is incident on the cylindrical lens at the incident angle corresponding to the emission angle. Accordingly, the irradiation position of the sheet-shaped excitation light can be scanned with respect to the sample. As a result, since the sample does not need to be moved or rotated during observation, it is possible to prevent the sample from shaking and to stably observe the sample. Further, since the irradiation position of the excitation light is scanned with respect to the sample by using the wavelength sweep light source, the spectroscopic element, and the cylindrical lens, the excitation light can be scanned fast with respect to the sample. Thus, according to the light sheet microscope, high-speed and stable observation can be realized.

In the light sheet microscope according to one aspect of the present disclosure, the spectroscopic element may be a diffraction grating or a prism. According to such a configuration, the above-described effect that the high-speed and stable observation can be realized is remarkably exhibited.

In the light sheet microscope according to one aspect of the present disclosure, the detection optical system may include a second objective lens into which the detection light is incident and a focal position adjuster which changes a focal position of the second objective lens in synchronization with a change in the wavelength of the excitation light output from the wavelength sweep light source. According to this configuration, the detection light can be detected with high accuracy even when the irradiation position of the excitation light with respect to the sample is scanned fast.

In the light sheet microscope according to one aspect of the present disclosure, the focal position adjuster may be a liquid lens. According to this configuration, the above-described effect that the detection light can be detected with high accuracy is remarkably exhibited even when the irradiation position of the excitation light with respect to the sample is scanned fast.

In the light sheet microscope according to one aspect of the present disclosure, the wavelength sweep light source may be configured to switch a central wavelength of the excitation light between a plurality of central wavelengths and the spectroscopic element may be rotated in accordance with the central wavelength of the excitation light output from the wavelength sweep light source. According to this configuration, the sample can be irradiated with the excitation lights having a plurality of central wavelengths.

In the light sheet microscope according to one aspect of the present disclosure, the irradiation optical system may include a plurality of the wavelength sweep light sources, the plurality of wavelength sweep light sources may output lights having different central wavelengths as the excitation light, and the excitation light output from the plurality of wavelength sweep light sources may be incident on the spectroscopic element at an incident angle corresponding to the central wavelength. According to this configuration, the sample can be irradiated with the excitation lights having a plurality of central wavelengths.

The light sheet microscope according to one aspect of the present disclosure may further include a moving mechanism which moves the wavelength sweep light source, the spectroscopic element, and the cylindrical lens along the optical axis of the cylindrical lens while maintaining a positional relationship between the spectroscopic element and the cylindrical lens. According to this configuration, it is possible to adjust the position of the beam waist of the excitation light emitted from the first objective lens, that is, the formation position of the sheet-shaped excitation light in the irradiation direction of the excitation light with respect to the sample.

The light sheet microscope according to one aspect of the present disclosure may further include a reflection part which reflects the excitation light emitted from the first objective lens toward the sample. Further, the light sheet microscope according to one aspect of the present disclosure may further include a container in which the sample is disposed and the reflection part may be provided in the container. According to this configuration, the sample can be irradiated with the sheet-shaped excitation light without the influence of the wall portion of the container.

In the light sheet microscope according to one aspect of the present disclosure, the detection optical system may include a second objective lens into which the detection light is incident and an optical axis of the second objective lens may be parallel to an optical axis of the first objective lens. According to this configuration, it is possible to facilitate the incorporation into a microscope such as an inverted microscope or an upright microscope.

A sample observation method according to one aspect of the present disclosure includes: irradiating a sample with excitation light having a wavelength for exciting the sample; guiding detection light emitted from the sample along with the irradiation of the excitation light; and detecting the detection light, in which the irradiating of the sample with the excitation light includes allowing light of which a wavelength changes with time to be output as the excitation light from a wavelength sweep light source, allowing the excitation light output from the wavelength sweep light source to be incident on a spectroscopic element and allowing the excitation light to be emitted from the spectroscopic element at an emission angle corresponding to the wavelength of the excitation light, allowing the excitation light emitted from the spectroscopic element to be incident on a cylindrical lens at an incident angle corresponding to the emission angle, and allowing the excitation light guided by a relay optical system including the cylindrical lens to be condensed and allowing the sample to be irradiated with the excitation light having a sheet shape.

In the sample observation method, light of which a wavelength changes with time is output from the wavelength sweep light source as the excitation light, the excitation light output from the wavelength sweep light source is emitted from the spectroscopic element at the emission angle corresponding to the wavelength, and the excitation light emitted from the spectroscopic element is incident on the cylindrical lens at the incident angle corresponding to the emission angle. Accordingly, the irradiation position of the sheet-shaped excitation light can be scanned with respect to the sample. As a result, since the sample does not need to be moved or rotated during observation, it is possible to prevent the sample from shaking and to stably observe the sample. Further, since the irradiation position of the excitation light is scanned with respect to the sample by using the wavelength sweep light source, the spectroscopic element, and the cylindrical lens, the excitation light can be scanned fast with respect to the sample. Thus, according to the light sheet microscope, high-speed and stable observation can be realized.

Advantageous Effects of Invention

According to one aspect of the present disclosure, it is possible to provide a light sheet microscope and a sample observation method capable of realizing high-speed and stable observation.

DESCRIPTION OF EMBODIMENTS

Figure 1:
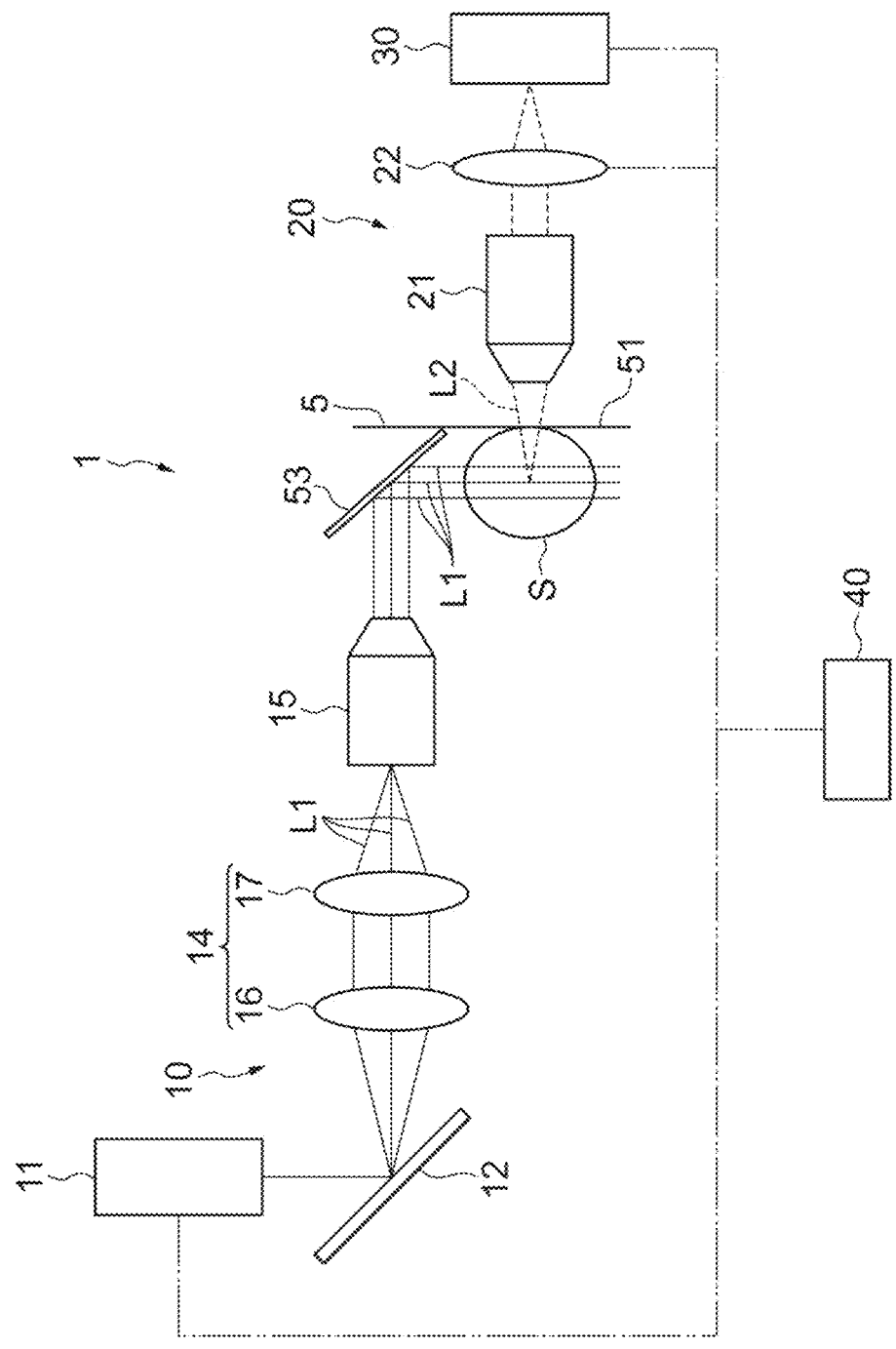
FIG. 1 is a diagram illustrating a configuration of a light sheet microscope according to an embodiment.

Hereinafter, one embodiment of the present disclosure will be described in detail with reference to the drawings. Additionally, in the following description, the same or equivalent components will be denoted by the same reference numerals and redundant description will be omitted.

A light sheet microscope 1 illustrated in FIG. 1 is a device that acquires an image of a sample S by irradiating the sample S with sheet-shaped (surface-shape) excitation light L1 and detecting detection light L2 emitted from the sample S along with the irradiation of the excitation light L1. In the light sheet microscope 1, an irradiation position of the excitation light L1 with respect to the sample S is scanned and the image of the sample S is acquired at each irradiation position. In the light sheet microscope 1, since an area of the sample S irradiated with the excitation light L1 is narrow, for example, deterioration of the sample S such as photobleaching or phototoxicity can be suppressed and image acquisition can be speeded up.

The sample S is, for example, a sample such as a cell or a living body containing a fluorescent substance such as a fluorescent dye or a fluorescent gene. The sample S emits the detection light L2 such as fluorescence when irradiated with light in a predetermined wavelength range. The sample S is disposed in, for example, a container 5 which is transparent with respect to at least the excitation light L1 and the detection light L2. The container 5 will be described in detail later.

As illustrated in FIG. 1, the light sheet microscope 1 includes an irradiation optical system 10, a detection optical system 20, a photodetector 30, and a control unit 40. The irradiation optical system 10 irradiates the sample S with the excitation light L1. The detection optical system 20 guides the detection light L2 emitted from the sample S along with the irradiation of the excitation light L1 to the photodetector 30. The photodetector 30 detects the detection light L2 guided by the detection optical system 20. The control unit 40 controls the operation of the irradiation optical system 10, the detection optical system 20, the photodetector 30, and the like.

The irradiation optical system 10 includes a wavelength sweep light source 11, a spectroscopic element 12, a relay optical system 14, and a first objective lens 15. The relay optical system 14 includes a cylindrical lens 16 and a lens 17.

The wavelength sweep light source 11 outputs the excitation light L1 having a wavelength that excites the sample S. The wavelength sweep light source 11 outputs light of which a wavelength changes with time as the excitation light L1. More specifically, the wavelength sweep light source 11 is a light source that sweeps a wavelength in a predetermined wavelength range by periodically changing the wavelength of the excitation light L1 to be output at high speed.

The wavelength sweep light source 11 may be any light source. However, it is preferable that the emission angle does not change during the wavelength sweep. As such a wavelength sweep light source 11, for example, a semiconductor laser light source in which the wavelength of the output light is variable due to a change in cavity length or a change in temperature or current value can be exemplified. The wavelength sweep light source 11 may be a unit in which a light source that outputs white laser light and an acousto-optic tunable filter (AOTF) that selectively transmits light in a specific wavelength range are combined. Alternatively, the wavelength sweep light source 11 may be a Littrow-type external cavity semiconductor laser light source, a vertical cavity surface emitting laser (VCSEL) light source, or an external cavity semiconductor laser light source using a KTN crystal.

The wavelength sweep light source 11 may emit coherent light. As a laser light source that outputs coherent light, a light source that oscillates a continuous wave may be used or a light source that oscillates pulsed light such as ultrashort pulsed light or a light source that outputs intensity-modulated light may be used. Furthermore, a unit obtained by combining these light sources and an optical shutter or an acousto-optic modulator (AOM) for pulse modulation may be used.

Figure 2:
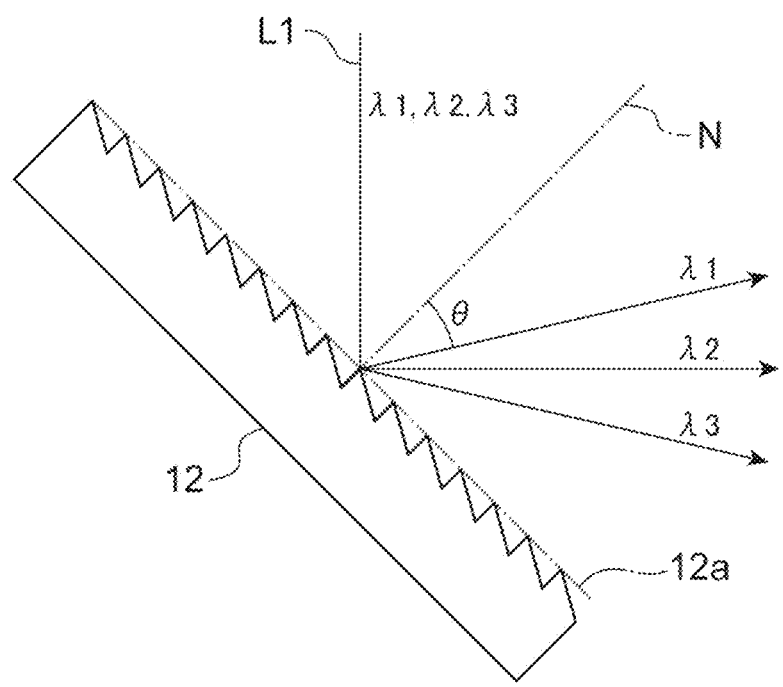
FIG. 2 is a diagram describing a spectroscopic element.

As illustrated in FIGS. 1 and 2, the excitation light L1 output from the wavelength sweep light source 11 is incident on the spectroscopic element 12. The spectroscopic element 12 emits the excitation light L1 at an emission angle $\theta$ corresponding to the wavelength of the incident excitation light L1. In this embodiment, the spectroscopic element 12 is a reflective blazed diffraction grating that diffracts the excitation light L1 at an emission angle $\theta$ corresponding to the wavelength of the incident excitation light L1. The emission angle $\theta$ is, for example, an angle of an optical axis of the excitation light L1 emitted from the spectroscopic element 12 with respect to a normal line N of a grating surface 12a of the spectroscopic element 12. FIG. 2 illustrates three excitation lights L1 respectively having wavelengths $\lambda 1$, $\lambda 2$, and $\lambda 3$ and emitted from the spectroscopic element 12 at different emission angles $\theta$.

The excitation light L1 emitted from the spectroscopic element 12 is incident on the cylindrical lens 16 at an incident angle corresponding to the emission angle $\theta$. The spectroscopic element 12 is disposed so that the excitation light L1 travels on the optical axis of the cylindrical lens 16, for example, when the excitation light L1 having a central wavelength in the wavelength sweep of the wavelength sweep light source 11 is emitted from the spectroscopic element 12. The cylindrical lens 16 is disposed on the optical axis so as to be away from the grating surface 12a (the emission surface) of the spectroscopic element 12 by the same distance (optical distance) as the focal distance of the cylindrical lens 16. The excitation light L1 incident on the cylindrical lens 16 is guided to the first objective lens 15 through the lens 17. The first objective lens 15 condenses the excitation light L1 guided by the relay optical system 14 and irradiates the sample S with the sheet-shaped excitation light L1. The first objective lens 15 and the lens 17 are disposed on the optical axis of the cylindrical lens 16. The spectroscopic element 12 may not be essentially disposed as described above.

Figure 3:
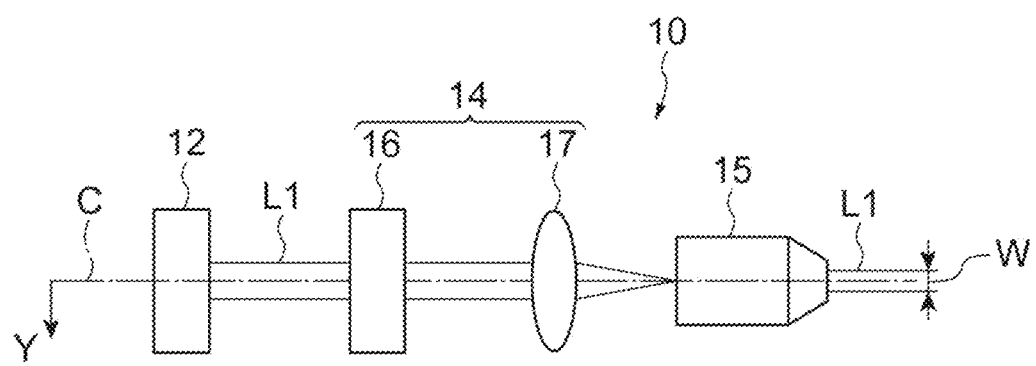
FIG. 3 is a diagram illustrating an irradiation optical system when viewed from an X-axis direction.
Figure 4:
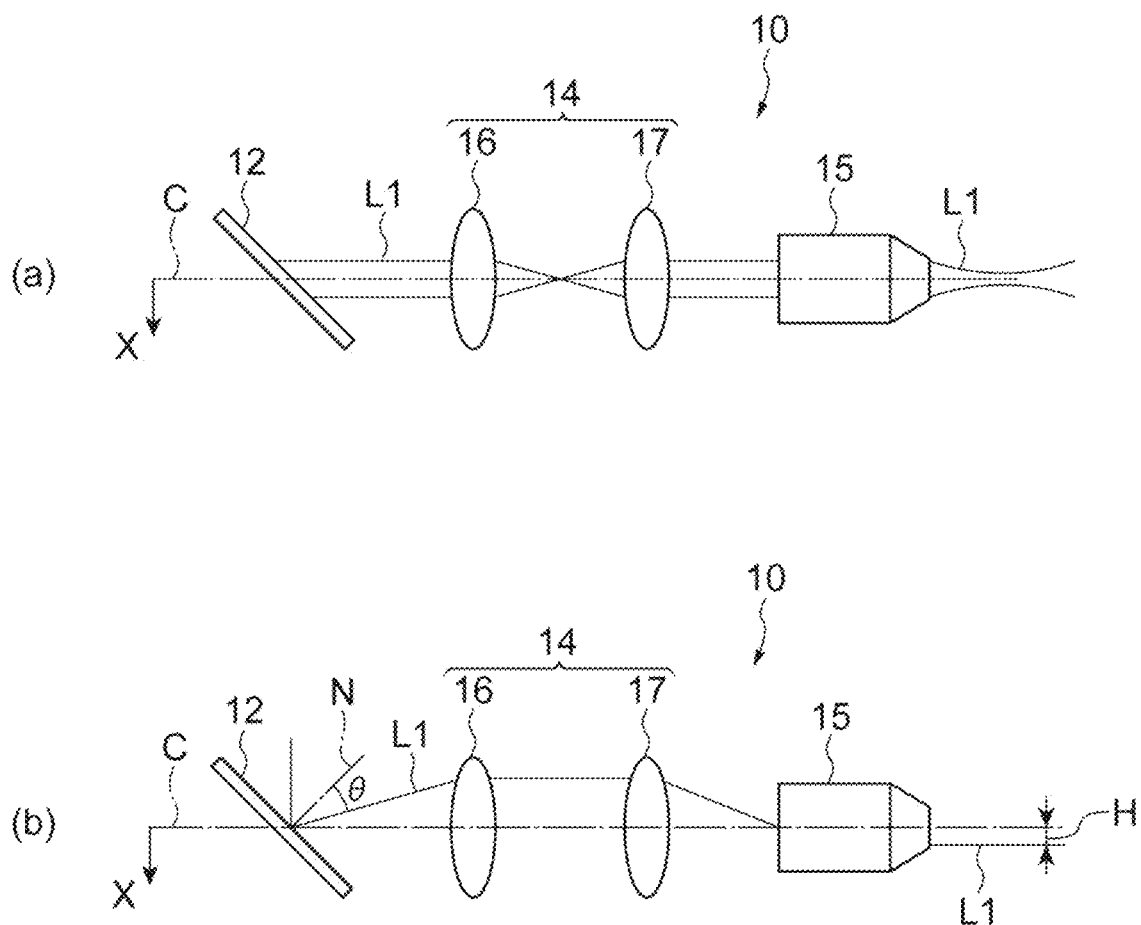
FIGS. 4(a) and 4(b) are diagrams illustrating the irradiation optical system when viewed from a Y-axis direction.

A case in which the excitation light L1 is framed in a sheet shape by the irradiation optical system 10 will be described with reference to FIGS. 3 and 4. The surface of the cylindrical lens 16 is curved along one direction (hereinafter, referred to as the X-axis direction) orthogonal to the optical axis C. The surface of the cylindrical lens 16 is formed in a linear shape and not curved along a direction (hereinafter, referred to as the Y-axis direction) orthogonal to the optical axis C and the X-axis direction. FIG. 3 is a diagram illustrating the irradiation optical system 10 when viewed from the X-axis direction and FIGS. 4(a) and 4(b) are diagrams illustrating the irradiation optical system 10 when viewed from the Y-axis direction.

As illustrated in FIG. 3, the cylindrical lens 16 does not function as a lens for a Y-axis direction element of the excitation light L1 which is output from the spectroscopic element 12. When viewed from the X-axis direction, the excitation light L1 having passed through the cylindrical lens 16 is condensed on the pupil of the first objective lens 15 by the lens 17. The lens 17 is a convex lens such as a biconvex lens or a plano-convex lens. Accordingly, a strip-shaped excitation light L1 having a constant width (width in the Y-axis direction) is emitted from the first objective lens 15. This width W is the width W of the sheet-shaped excitation light L1 with which the sample S is irradiated. The width W of the sheet-shaped excitation light L1 can be adjusted by the focal distance of the lens 17. Alternatively, the width W of the sheet-shaped excitation light L1 may be adjusted by inserting an aperture on the optical path between the wavelength sweep light source 11 and the spectroscopic element 12 or may be adjusted by changing the focal distance of the lens 17.

As illustrated in FIGS. 4(a) and 4(b), the cylindrical lens 16 functions as a lens for the X-axis direction element of the excitation light L1 output from the spectroscopic element 12. When viewed from the Y-axis direction, the cylindrical lens 16 and the lens 17 constitute a pupil transmission optical system and the excitation light L1 incident on the cylindrical lens 16 is transmitted to the pupil of the first objective lens 15 through the lens 17. Accordingly, the linear excitation light L1 parallel to the optical axis C is emitted from the first objective lens 15. Thus, the excitation light L1 emitted from the first objective lens 15 has a sheet shape when viewed three-dimensionally.

As illustrated in FIG. 4(b), the emission angle $\theta$ is the emission angle of the excitation light L1 from the spectroscopic element 12 when viewed from the Y-axis direction. That is, the spectroscopic element 12 emits the excitation light L1 at the emission angle $\theta$ corresponding to the wavelength of the excitation light L1 when viewed from the Y-axis direction.

The height (the distance from the optical axis C in the X-axis direction) H of the sheet-shaped excitation light L1 emitted from the first objective lens 15 corresponds to the incident angle of the excitation light L1 which is incident on the cylindrical lens 16. This is because the pupil plane of the first objective lens 15 has a conjugate relationship with the grating surface 12a by the relay optical system 14. That is, the height H corresponds to the emission angle $\theta$ of the excitation light L1 emitted from the spectroscopic element 12. In other words, in the irradiation optical system 10, the emission angle θ is converted into the height H of the sheet-shaped excitation light L1 emitted from the first objective lens 15. Thus, it is possible to quickly change the height H of the sheet-shaped excitation light L1 emitted from the first objective lens 15 by quickly changing the wavelength of the excitation light L1 output from the wavelength sweep light source 11 so that the emission angle θ of the excitation light L1 emitted from the spectroscopic element 12 is changed quickly.

Figure 5:
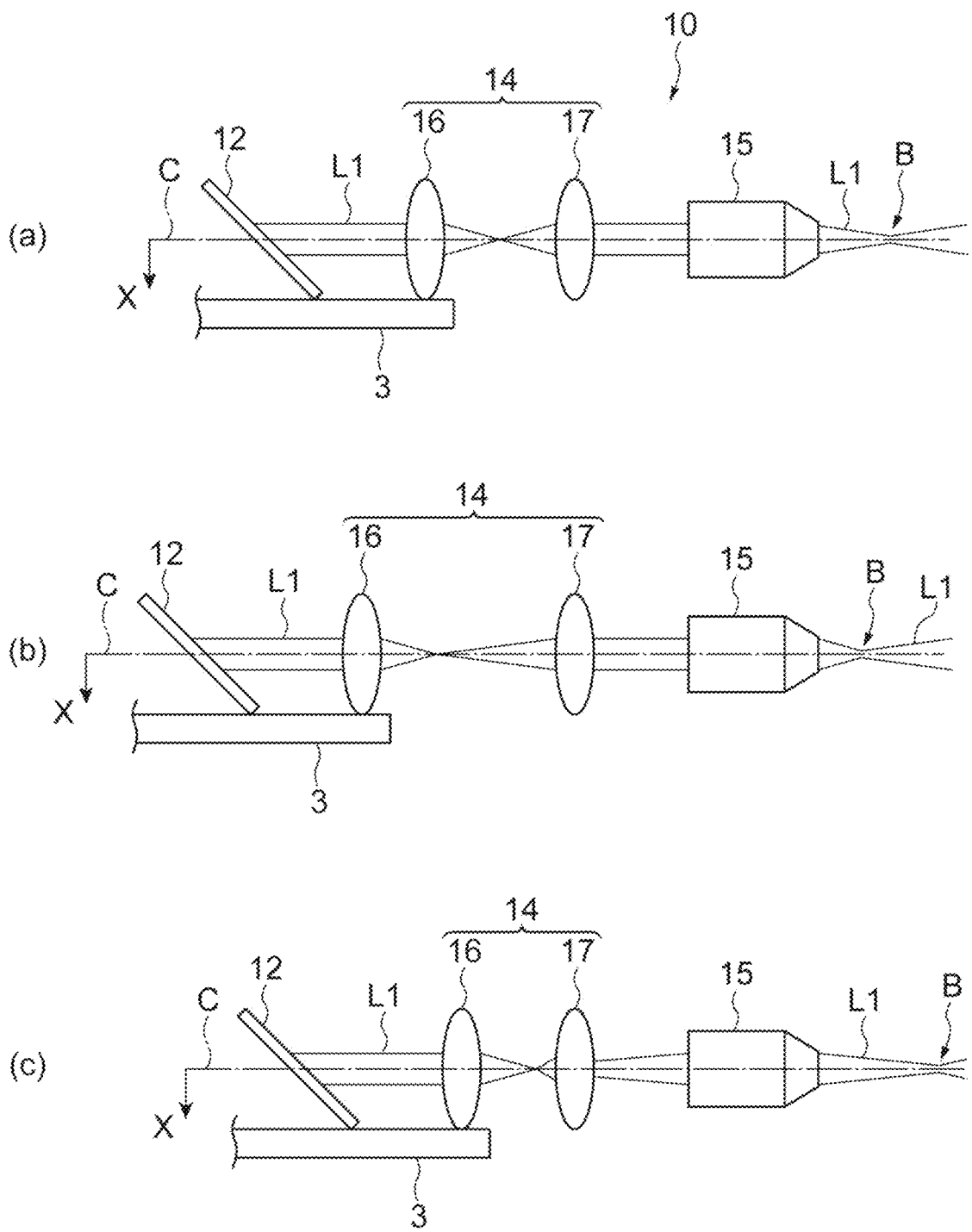
FIGS. 5(a) to 5(c) are diagrams describing an adjustment of a position of a beam waist.

Referring to FIGS. 5(a) to 5(c), the adjustment of the position of the beam waist (the portion having a minimum thickness of the sheet-shaped excitation light when viewed from the Y-axis direction) B of the excitation light L1 emitted from the first objective lens 15 will be described. The excitation light L1 of the beam waist B is scanned as the sheet-shaped excitation light L1 with respect to the sample S. That is, the position of the beam waist B corresponds to the formation position of the sheet-shaped excitation light L1 in the irradiation direction of the excitation light L1 with respect to the sample S.

As means for adjusting the position of the beam waist B, the light sheet microscope 1 further includes a moving mechanism 3 that moves the wavelength sweep light source 11, the spectroscopic element 12, and the cylindrical lens 16 along the optical axis C while maintaining the positional relationship (the optical distance) between the spectroscopic element 12 and the cylindrical lens 16. The moving mechanism 3 is, for example, a movable stage or the like. The moving mechanism 3 is electrically connected to the control unit 40 and its driving is controlled by the control unit 40.

As illustrated in FIGS. 5(a) and 5(b), the beam waist B can be moved to the first objective lens 15 by moving the wavelength sweep light source 11, the spectroscopic element 12, and the cylindrical lens 16 so as to be away from the lens 17 using the moving mechanism 3. As illustrated in FIGS. 5(a) and 5(c), the beam waist B can be moved to the side opposite to the first objective lens 15 by moving the wavelength sweep light source 11, the spectroscopic element 12, and the cylindrical lens 16 so as to be close to the lens 17 using the moving mechanism 3. Additionally, the wavelength sweep light source 11 may be optically connected to the spectroscopic element 12 through an optical member such as a fiber or a collimator lens. In that case, such an optical member is also moved by the moving mechanism 3 together with the wavelength sweep light source 11, the spectroscopic element 12, and the cylindrical lens 16.

Figure 6:
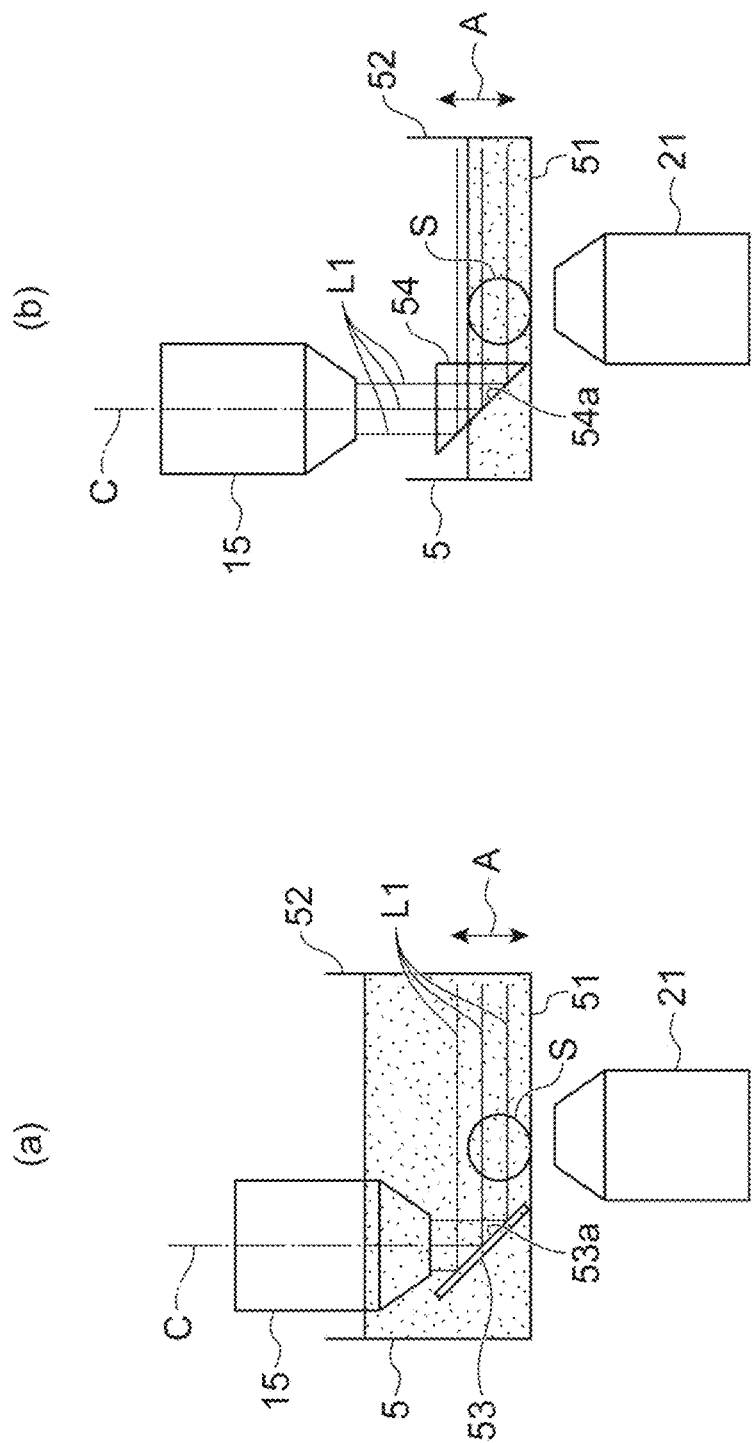
FIGS. 6(a) and 6(b) are diagrams illustrating a configuration in the periphery of a container where a sample is disposed.

As illustrated in FIGS. 6(a) and 6(b), the sample S is disposed in the container 5. The container 5 is made of, for example, glass, plastic, or the like and includes a bottom wall portion 51 and a side wall portion 52. The bottom wall portion 51 is, for example, a cover glass, a glass bottom dish, or the like. For example, the side wall portion 52 extends from the edge of the bottom wall portion 51 in a direction orthogonal to the bottom wall portion 51 and has a cylindrical or prismatic shape. The container 5 is disposed, for example, so that the bottom wall portion 51 is located vertically below the side wall portion 52. The sample S is disposed in, for example, a storage space defined by the bottom wall portion 51 and the side wall portion 52 together with a culture solution. The sample S is disposed on the bottom wall portion 51. In a case where the sample is a dry object, the container 5 may not be used.

As illustrated in FIG. 6(a), the first objective lens 15 is, for example, a water immersion objective lens and is disposed so as to be immersed in the culture solution. The bottom wall portion 51 of the container 5 is provided with a mirror (reflection part) 53 which reflects the excitation light L1 emitted from the first objective lens 15 toward the sample S at a predetermined angle (for example, vertically). The mirror 53 includes a reflection surface 53a which extends so as to be inclined with respect to each of the optical axis of the first objective lens 15 and the bottom wall portion 51 by 45°. The scanning direction of the sheet-shaped excitation light L1 with respect to the sample S is a direction indicated by an arrow A (a direction along the optical axis (the optical axis C) of the first objective lens 15). The mirror (the reflection part) 53 may not be provided in the container 5. For example, the mirror 53 may be attached to the first objective lens 15 via an attachment.

As illustrated in FIG. 6(b), the first objective lens 15 may be a dry objective lens or may be disposed outside a culture solution. The working distance of the dry objective lens is longer than the working distance of the water immersion objective lens. In this case, the bottom wall portion 51 of the container 5 is provided with a prism (reflection part) 54 which reflects the excitation light L1 emitted from the first objective lens 15 toward the sample S at a predetermined angle (for example, vertically). The prism 54 includes a reflection surface 54a which extends so as to be inclined with respect to each of the optical axis of the first objective lens 15 and the bottom wall portion 51 by 45°. The scanning direction of the sheet-shaped excitation light L1 with respect to the sample S is a direction indicated by an arrow A. The prism (the reflection part) 54 may not be provided in the container 5. For example, the prism 54 may be attached to the first objective lens 15 through an attachment.

When the reflection part is the mirror 53, a water immersion objective lens having a short working distance can be used. In this case, since the same medium exists between the first objective lens 15 and the sample S and the aberration occurring when passing through an interface of different media does not need to be corrected, the numerical aperture (NA) of the first objective lens 15 can be increased. On the other hand, when the reflection part is the prism 54, a dry objective lens having a long working distance can be used. In this case, it is possible to save the trouble when cleaning the lens and to easily perform the measurement that requires the frequent exchange of the sample S, the measurement that uses a liquid for immersing the first objective lens 15, the measurement that requires a long time, and the like.

The detection optical system 20 includes a second objective lens 21 and a liquid lens (a focal position adjuster) 22. The second objective lens 21 guides the detection light L2 emitted from the sample S along with the irradiation of the excitation light L1 to the photodetector 30. The second objective lens 21 is disposed so as to face the sample S with the bottom wall portion 51 disposed therebetween. As illustrated in FIGS. 1, 6(a), and 6(b), the optical axis of the second objective lens 21 is parallel to the optical axis of the first objective lens 15 and is orthogonal to a plane where the sheet-shaped excitation light L1 for the sample S is formed. In this embodiment, the excitation light L1 which is emitted from the first objective lens 15 and travels downward vertically is reflected by the mirror 53 or the prism 54 and travels in the horizontal direction so that the sample S is irradiated with the light. The detection light L2 which is emitted from the sample S along with the irradiation of the excitation light L1 and travels downward vertically is incident on the second objective lens 21.

The liquid lens 22 is a lens of which a focal distance is variable in accordance with an input signal. In the detection optical system 20, the focal position of the second objective lens 21 can be adjusted by changing the focal distance of the liquid lens 22. In the light sheet microscope 1, the focal distance of the liquid lens 22 changes in synchronization with a change in the wavelength of the excitation light L1 output from the wavelength sweep light source 11 so that the focal position of the second objective lens 21 matches the irradiation position of the excitation light L1 with respect to the sample S. Accordingly, the detection light L2 can be imaged on the photodetector 30. Thus, the detection light L2 can be detected with high accuracy even when the irradiation position of the excitation light L1 with respect to the sample S is scanned fast. Additionally, the detection optical system 20 may further include a convex lens disposed between the second objective lens 21 and the liquid lens 22. In this case, the adjustment range of the focal position of the second objective lens 21 using the liquid lens 22 can be widened.

The photodetector 30 captures an image of the detection light L2 guided by the second objective lens 21. As the photodetector 30, for example, a CMOS camera, a CCD camera, a multi-anode photomultiplier tube, a two-dimensional image sensor such as single photon avalanche diode (SPAD), a line sensor, or the like can be exemplified. Alternatively, the photodetector 30 may be a point light sensor such as an avalanche photodiode or a spectroscope.

The control unit 40 is configured as, for example, a computer including a processor, a memory, and the like. The control unit 40 performs various kinds of control by controlling the operations of the moving mechanism 3, the wavelength sweep light source 11, the liquid lens 22, the photodetector 30, and the like using the processor. For example, the control unit 40 changes the wavelength of the excitation light L1 output from the wavelength sweep light source 11 with time so that the emission angle θ of the excitation light L1 emitted from the spectroscopic element 12 changes with time. Further, the control unit 40 changes the focal distance of the liquid lens 22 in synchronization with a change in the wavelength of the excitation light L1 output from the wavelength sweep light source 11 so that the focal position of the second objective lens 21 matches the irradiation position of the excitation light L1 with respect to the sample S. Additionally, at least one of the first objective lens 15 and the second objective lens 21 may be movable along the optical axis by a drive element such as a piezo actuator or a stepping motor. In this case, the control unit 40 also controls the operation of the drive element.

As described above, in the light sheet microscope 1, light of which a wavelength changes with time is output from the wavelength sweep light source 11 as the excitation light L1, the excitation light L1 output from the wavelength sweep light source 11 is emitted from the spectroscopic element 12 at the emission angle θ corresponding to the wavelength, and the excitation light L1 emitted from the spectroscopic element 12 is incident on the cylindrical lens 16 at the incident angle corresponding to the emission angle θ. Accordingly, the irradiation position of the sheet-shaped excitation light L1 can be scanned with respect to the sample S. As a result, since the sample S does not need to be moved or rotated during observation, it is possible to prevent the sample S from shaking and to stably observe the sample S. Further, since the irradiation position of the excitation light L1 with respect to the sample S is scanned by using the wavelength sweep light source 11, the spectroscopic element 12, and the cylindrical lens 16, the excitation light L1 can be scanned fast with respect to the sample S. Thus, according to the light sheet microscope 1, high-speed and stable observation can be realized. Further, for example, compared to a case in which the irradiation position of the sheet-shaped excitation light L1 is mechanically scanned with respect to the sample S by using a Galvano mirror or the like, the stability is excellent, the life of components is long, and the observation is fast. Furthermore, the wavelength sweep range and the central wavelength of the excitation light L1 irradiated for the sample S can be changed with time. For that reason, this can be suitably used for the observation which requires a change in the wavelength sweep range and the central wavelength of the irradiation light for the sample S with time. For example, in a case in which the chemical composition of the measurement target or the like changes with time and the peak of the absorption spectrum changes, the wavelength sweep range and the central wavelength of the irradiation light can be corrected (calibrated) in accordance with the change. Alternatively, when the observation target itself changes with time, the wavelength sweep range and the central wavelength of the irradiation light can be changed to the wavelength sweep range and the central wavelength suitable for the absorption spectrum of the material of the observation target.

In the light sheet microscope 1, the spectroscopic element 12 is a diffraction grating. Accordingly, the above-described effect that the high-speed and stable observation can be realized can be remarkably exhibited.

In the light sheet microscope 1, the detection optical system 20 includes the liquid lens 22 (the focal position adjuster) which changes the focal position of the second objective lens 21 in synchronization with a change in the wavelength of the excitation light L1 output from the wavelength sweep light source 11. Accordingly, the detection light L2 can be detected with high accuracy even when the irradiation position of the excitation light L1 with respect to the sample S is scanned fast.

The light sheet microscope 1 includes the moving mechanism 3 which moves the wavelength sweep light source 11, the spectroscopic element 12, and the cylindrical lens 16 along the optical axis C while maintaining a positional relationship between the spectroscopic element 12 and the cylindrical lens 16. Accordingly, it is possible to adjust the position of the beam waist B of the excitation light L1 emitted from the first objective lens 15, that is, the formation position of the sheet-shaped excitation light L1 in the irradiation direction of the excitation light L1 with respect to the sample S. If the reflection part is the prism 54, it is possible to prevent the displacement of the position of the beam waist B by changing the optical path length when the excitation light L1 passes through the prism 54.

In the light sheet microscope 1, the container 5 is provided with the mirror 53 or the prism 54 (the reflection part) which reflects the excitation light L1 emitted from the first objective lens 15 toward the sample S. Accordingly, the sample S can be irradiated with the sheet-shaped excitation light L1 without the influence of the side wall portion 52 of the container 5. Further, since the reflection part for guiding the excitation light L1 can be incorporated into the container 5, the number of components can be decreased and the apparatus can be decreased in size. Further, the sample S can be reliably accurately irradiated with the excitation light L1 compared to a case in which the reflection part is separated from the container 5. Further, since the first objective lens 15 and the second objective lens 21 can be disposed so that their optical axes are parallel to each other, it is possible to facilitate the incorporation into a microscope such as an inverted microscope or an upright microscope. The mirror 53 or the prism 54 may not be provided in the container 5. For example, the mirror 53 or the prism 54 may be attached to the first objective lens 15 via an attachment. That is, it is possible to facilitate the incorporation into a general-purpose microscope by converting the angle modulation using the spectroscopic element 12 into the height modulation and changing the traveling direction of the sheet-shaped excitation light L1. Further, the first objective lens 15 and the second objective lens 21 can be disposed three-dimensionally in a range without interference by setting the reflection angle by the reflection part. Further, since the combination with the microcell chamber or the microchannel can be facilitated, reliable observation can be realized.

In the light sheet microscope 1, the optical axis of the second objective lens 21 is parallel to the optical axis of the first objective lens 15. Accordingly, it is possible to facilitate the incorporation into a microscope such as an inverted microscope or an upright microscope.

A sample observation method using the light sheet microscope 1 includes irradiating the sample S with the excitation light L1 having a wavelength for exciting the sample S, guiding the detection light L2 emitted from the sample S along with the irradiation of the excitation light L1, and detecting the detection light L2. The irradiating of the sample S with the excitation light L1 includes light of which a wavelength changes with time being output from the wavelength sweep light source 11 as the excitation light L1, the excitation light L1 output from the wavelength sweep light source 11 being incident on the spectroscopic element 12 and the excitation light L1 being output from the spectroscopic element 12 at the emission angle θ corresponding to the wavelength of the excitation light L1, the excitation light L1 emitted from the spectroscopic element 12 being incident on the cylindrical lens 16 at the incident angle corresponding to the emission angle θ, and the excitation light L1 guided by the relay optical system 14 including the cylindrical lens 16 being condensed and the sample S being irradiated with the sheet-shaped excitation light L1. According to the sample observation method, high-speed and stable observation can be realized by the above-described reason.

Although one embodiment of the present disclosure has been described above, the present disclosure is not limited to the above-described embodiment. For example, the material and shape of each component are not limited to the materials and shapes described above and various materials and shapes can be adopted.

Figure 7:
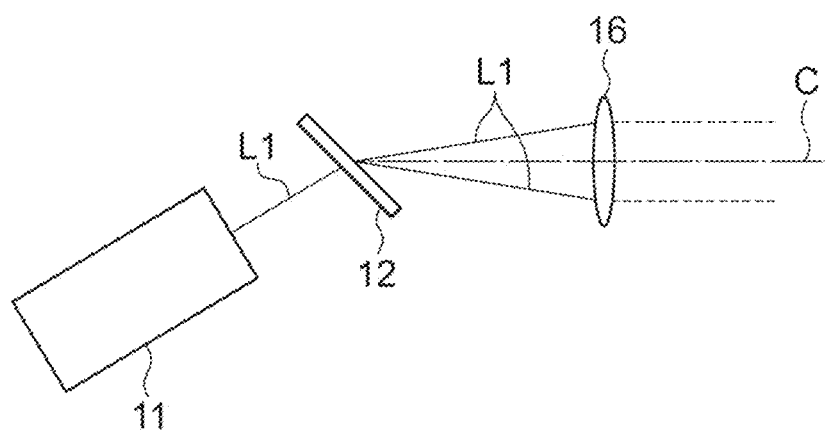
FIGS. 7(a) to 7(c) are diagrams illustrating a modified example.
Figure 7:
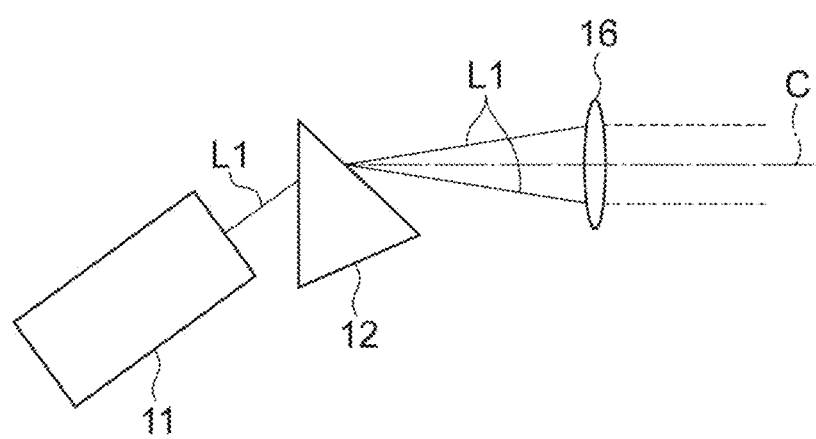
Figure 7:
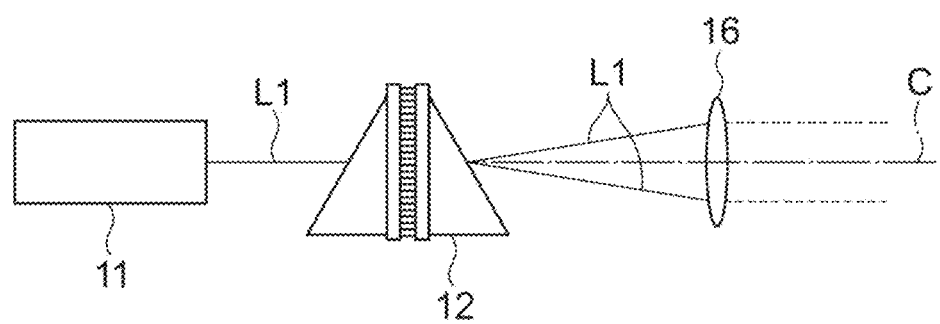

As illustrated in FIG. 7(a), the spectroscopic element 12 may be a transmission type diffraction grating. Such a spectroscopic element 12 includes, for example, a slit. As illustrated in FIG. 7(b), the spectroscopic element 12 may be a prism. In this case, the spectroscopic element 12 is configured to be rotatable around the Y-axis direction and the irradiation optical system 10 includes a drive unit which drives the spectroscopic element 12 so as to rotate around the Y axis. This drive unit is, for example, a stepping motor, a piezo actuator, or the like. The drive unit is electrically connected to the control unit 40 and its driving is controlled by the control unit 40. The spectroscopic element 12 is rotated around the Y axis in accordance with the wavelength of the excitation light L1 output from the wavelength sweep light source 11 by the drive unit so that the excitation light L1 is emitted from the spectroscopic element 12 on the optical axis C. As illustrated in FIG. 7(c), the spectroscopic element 12 may be a grism obtained by combining a diffraction grating with a prism. Also in such a modified example, high-speed and stable observation can be realized similarly to the above-described embodiment. Further, since the traveling direction of the light of the central wavelength does not change before and after the incidence when the spectroscopic element 12 is a grism, the design of the optical system can be facilitated.

In the above-described embodiment, the wavelength sweep light source 11 may be configured to be able to switch the central wavelength of the excitation light L1 between the plurality of central wavelengths. In this case, the spectroscopic element 12 is configured to be rotatable around the Y-axis direction and the irradiation optical system 10 includes a drive unit which drives the spectroscopic element 12 so as to rotate around the Y axis. This drive unit is, for example, a stepping motor, a piezo actuator, or the like. The drive unit is electrically connected to the control unit 40 and its driving is controlled by the control unit 40. The spectroscopic element 12 is rotated around the Y-axis direction in accordance with the central wavelength of the excitation light L1 output from the wavelength sweep light source 11 by the drive unit so that the excitation light L1 of the central wavelength travels on the optical axis C. Also in the modified example, high-speed and stable observation can be realized similarly to the above-described embodiment. Further, the sample S can be irradiated with the excitation lights L1 having a plurality of central wavelengths.

Figure 8:
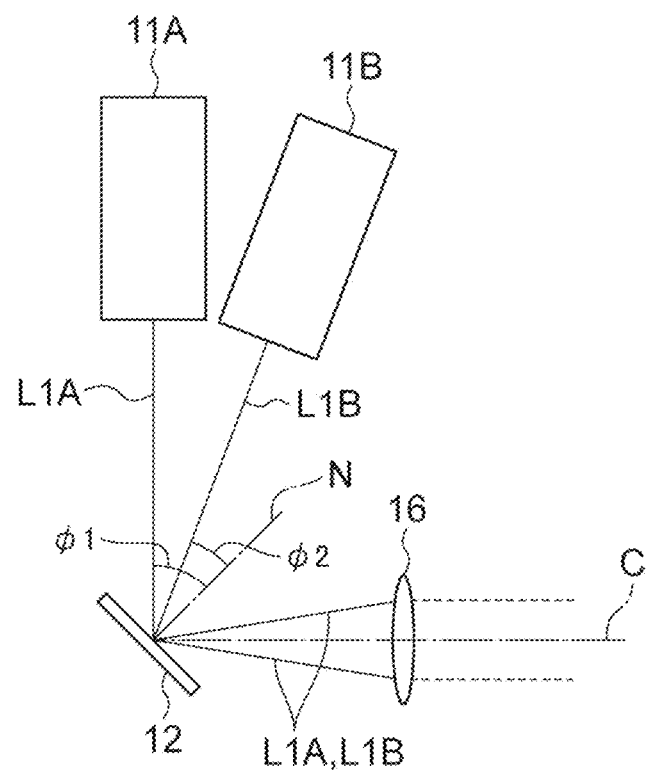
FIG. 8 is a diagram illustrating another modified example.

As illustrated in FIG. 8, the irradiation optical system 10 may include a plurality of wavelength sweep light sources 11A and 11B which output lights having different central wavelengths as the excitation light L1. In this case, the excitation light L1 output from each of the wavelength sweep light sources 11A and 11B is incident on the spectroscopic element 12 at the incident angle corresponding to the central wavelength. That is, the wavelength sweep light sources 11A and 11B are disposed so that the incident condition is satisfied. Specifically, excitation light L1A output from the wavelength sweep light source 11A is incident on the spectroscopic element 12 at an incident angle φ1 corresponding to the central wavelength of the excitation light L1A so that the excitation light L1A having a central wavelength travels on the optical axis C. Excitation light L1B output from the wavelength sweep light source 11B is incident on the spectroscopic element 12 at an incident angle φ2 corresponding to the central wavelength of the excitation light L1B so that the excitation light L1B having a central wavelength travels on the optical axis C. The incident angles φ1 and φ2 are different from each other. Also in the modified example, high-speed and stable observation can be realized similarly to the above-described embodiment. Further, the sample S can be irradiated with the excitation lights L1 having a plurality of central wavelengths. Additionally, in the modified example, a mirror or the like having a variable reflection angle may be disposed between at least one of the plurality of wavelength sweep light sources 11 and the spectroscopic element 12. The excitation light L1 may be output from at least one of the plurality of wavelength sweep light sources 11 to the spectroscopic element 12 through an optical fiber.

In the above-described embodiment, the liquid lens 22 may be omitted. In this case, the second objective lens 21 may be mechanically moved by a piezo actuator or the like and a zoom lens disposed between the second objective lens 21 and the photodetector 30 may be mechanically moved. However, in the above-described embodiment, since the focal position of the second objective lens 21 is quickly changed by the electric control using the liquid lens 22, the focal position of the second objective lens 21 can be reliably synchronized with a change in the emission angle θ of the excitation light L1 emitted from the spectroscopic element 12. Alternatively, when the liquid lens 22 is omitted, the sheet-shaped excitation light L1 may be scanned with respect to the sample S in the focal depth of the second objective lens 21 by using an objective lens having a deep focal depth as the second objective lens 21. In this case, the adjustment of the focal position of the second objective lens 21 can be omitted.

The cylindrical lens 16 may be configured as a spatial light modulator (SLM) that modulates the excitation light L1 in accordance with the phase pattern corresponding to the cylindrical lens. If the focal position adjuster can adjust the focal position of the second objective lens 21, the focal position adjuster may be configured other than the liquid lens 22. The moving mechanism 3 may be omitted. The mirror 53 or the prism 54 may be provided separately from the container 5. The optical axis of the first objective lens 15 and the optical axis of the second objective lens 21 may intersect (for example, orthogonal to) each other. The detection optical system 20 may further include, for example, an optical filter which is provided between the second objective lens 21 and the liquid lens 22 so as to separate the excitation light L1 and the detection light L2 from the light guided by the second objective lens 21 and output the extracted detection light L2 to the photodetector 30. The spectroscopic element 12 may be configured as a spatial light modulator. For example, the spectroscopic element 12 may be configured as a spatial light modulator that modulates the excitation light L1 in accordance with a diffraction grating pattern. In this case, the grating constant can be changed by changing the diffraction grating pattern. The cylindrical lens 16 and the spectroscopic element 12 may be configured as a single spatial light modulator.

REFERENCE SIGNS LIST

1: light sheet microscope, 3: moving mechanism, 5: container, 10: irradiation optical system, 11: wavelength sweep light source, 12: spectroscopic element, 14: relay optical system, 15: first objective lens, 16: cylindrical lens, 20: detection optical system, 21: second objective lens, 22: liquid lens (focal position adjuster), 30: photodetector, 53: mirror (reflection part), 54: prism (reflection part), B: beam waist, C: optical axis, L1: excitation light, L2: detection light, S: sample, θ: emission angle.

The invention claimed is:

1. A light sheet microscope comprising: an irradiation optical system configured to irradiate a sample with excitation light having a wavelength for exciting the sample; a detection optical system configured to guide detection light emitted from the sample along with the irradiation of the excitation light; and a photodetector configured to detect the detection light guided by the detection optical system, the irradiation optical system including a wavelength sweep light source configured to output light of which a wavelength changes with time as the excitation light, a spectroscopic element on which the excitation light output from the wavelength sweep light source is incident and which emits the excitation light at an emission angle corresponding to the wavelength of the excitation light, a relay optical system which includes a cylindrical lens on which the excitation light emitted from the spectroscopic element is incident at an incident angle corresponding to the emission angle, and a first objective lens configured to condense the excitation light guided by the relay optical system and irradiate the sample with sheet-shaped excitation light, wherein the wavelength sweep light source is configured to sweep the wavelength of the excitation light in a predetermined wavelength range by periodically changing the wavelength of the excitation light to be output at high speed, and wherein a height of the sheet-shaped excitation light emitted from the first objective lens is changed by changing the wavelength of the excitation light output from the wavelength sweep light source so that the emission angle of the excitation light emitted from the spectroscopic element is changed in accordance with an observation target.

2. The light sheet microscope according to claim 1, wherein the spectroscopic element is a diffraction grating.

3. The light sheet microscope according to claim 1, wherein the spectroscopic element is a prism.

4. The light sheet microscope according to claim 1, wherein the detection optical system includes a second objective lens on which the detection light is incident and a focal position adjuster configured to change a focal position of the second objective lens in synchronization with a change in the wavelength of the excitation light output from the wavelength sweep light source.

5. The light sheet microscope according to claim 4, wherein the focal position adjuster is a liquid lens.

6. The light sheet microscope according to claim 1, wherein the wavelength sweep light source is configured to be able to switch a central wavelength of the excitation light between a plurality of central wavelengths, and
wherein the spectroscopic element is rotated in accordance with the central wavelength of the excitation light output from the wavelength sweep light source.

7. The light sheet microscope according to claim 1, wherein the irradiation optical system includes a plurality of the wavelength sweep light sources,
wherein the plurality of wavelength sweep light sources output lights having different central wavelengths as the excitation light, and
wherein the excitation light output from the plurality of wavelength sweep light sources is incident on the spectroscopic element at an incident angle corresponding to the central wavelength.

8. The light sheet microscope according to claim 1, further comprising:
a moving mechanism configured to move the wavelength sweep light source, the spectroscopic element, and the cylindrical lens along an optical axis of the cylindrical lens while maintaining a positional relationship between the spectroscopic element and the cylindrical lens.

9. The light sheet microscope according to claim 1, further comprising:
a reflector configured to reflect the excitation light emitted from the first objective lens toward the sample.

10. The light sheet microscope according to claim 9, further comprising:
a container in which the sample is disposed,
wherein the container is provided with the reflector.

11. The light sheet microscope according to claim 1,
wherein the detection optical system includes a second objective lens on which the detection light is incident, and
wherein an optical axis of the second objective lens is parallel to an optical axis of the first objective lens.

12. A sample observation method comprising: irradiating a sample with excitation light having a wavelength for exciting the sample; guiding detection light emitted from the sample along with the irradiation of the excitation light; and detecting the detection light, the irradiating of the sample with the excitation light including light of which a wavelength changes with time being output as the excitation light from a wavelength sweep light source, the excitation light output from the wavelength sweep light source being incident on a spectroscopic element and the excitation light being emitted from the spectroscopic element at an emission angle corresponding to the wavelength of the excitation light, the excitation light emitted from the spectroscopic element being incident on a cylindrical lens at an incident angle corresponding to the emission angle, and the excitation light guided by a relay optical system including the cylindrical lens being condensed and the sample being irradiated with sheet-shaped excitation light, wherein the wavelength sweep light source is configured to sweep the wavelength of the excitation light in a predetermined wavelength range by periodically changing the wavelength of the excitation light to be output at high speed, and wherein a height of the sheet-shaped excitation light is changed by changing the wavelength of the excitation light output from the wavelength sweep light source so that the emission angle of the excitation light emitted from the spectroscopic element is changed in accordance with an observation target.

* * * * *